(12) United States Patent
Nørgaard et al.

(10) Patent No.: US 12,212,863 B2
(45) Date of Patent: Jan. 28, 2025

(54) METHOD FOR RECORDING ULTRA-SHORT-EXPOSURE, HIGH DYNAMIC RANGE IMAGES AND RELATED IMAGING DEVICE

(71) Applicant: Phase One A/S, Frederiksberg (DK)

(72) Inventors: Lau Nørgaard, Roskilde (DK); Thomas Andersen, Køge (DK)

( * ) Notice: Subject to any disclaimer, the term of this patent is extended or adjusted under 35 U.S.C. 154(b) by 0 days.

(21) Appl. No.: 18/370,441

(22) Filed: Sep. 20, 2023

(65) Prior Publication Data

US 2024/0129646 A1 Apr. 18, 2024

(30) Foreign Application Priority Data

Sep. 21, 2022 (DK) .............................. PA202270459

(51) Int. Cl.
*H04N 25/532* (2023.01)
*H04N 25/78* (2023.01)

(52) U.S. Cl.
CPC .......... *H04N 25/532* (2023.01); *H04N 25/78* (2023.01)

(58) Field of Classification Search
None
See application file for complete search history.

(56) References Cited

U.S. PATENT DOCUMENTS

| | | |
|---|---|---|
| 7,889,273 B2 | 2/2011 | Ward |
| 2004/0212723 A1 | 10/2004 | Lin |
| 2007/0230939 A1 | 10/2007 | Tanaka |
| 2017/0366772 A1 | 12/2017 | Johnson |
| 2019/0014267 A1 | 1/2019 | Kunieda |

FOREIGN PATENT DOCUMENTS

| | | |
|---|---|---|
| CN | 114914258 | 8/2022 |
| EP | 2107610 | 10/2009 |
| WO | 9926408 | 5/1999 |

*Primary Examiner* — Mark T Monk (57) ABSTRACT

In global shutter image sensors, the light shields are often not completely lightproof and incoming light causes continued exposure even after the global shutter is shut. This 'parasitic light' degrades the recorded image. Disclosed is a method, performed by an imaging device with a global shutter image sensor, for recording an image with reduced degrading effects from parasitic light in the image sensor. The disclosed device and related method combine the global shutter functionality of the global shutter image sensor with a shutter such as a mechanical shutter. A precise synchronization of the closing of the shutter means that the shutter can block all incoming light—and thus stop parasitic light in the image sensor—shortly after the exposure is stopped by the global shutter image sensor. This allows the imaging device to record very short exposure images without the detrimental effects of parasitic light.

13 Claims, 5 Drawing Sheets

METHOD FOR RECORDING ULTRA-SHORT-EXPOSURE, HIGH DYNAMIC RANGE IMAGES AND RELATED IMAGING DEVICE

The present disclosure pertains to the field of digital imaging. The present disclosure relates to a method of recording digital images with short exposure time and high dynamic range and related imaging device.

BACKGROUND

Mechanical shutters are limited to longer exposure times that result in motion blur from either camera movement or movement of objects in the image. Global shutter image sensors enable much faster exposure times than typically possible with mechanical shutters, and global shutter image sensors such as the ones from the Sony Pregius range can provide image capture with exposure times as short as or shorter than 1/100.000 s that avoid or reduces motion blur. However, the mechanism of CMOS global shutter sensor technology is not perfect, which makes it impossible to fully benefit from the potential of global shutter sensors to enable super-short exposure times in fast moving or dynamic scenes using natural lighting.

Pulsed light sources such as flash tube or LED lights can provide an illumination difference between the exposure period and the sensor readout period may solve this problem and is regularly used in high-speed photography. This can however only be used in environments and applications where it is practically possible to apply artificial illumination. This makes this approach best suited to indoor and other controlled situations and unfeasible for most outdoor and large area applications.

Other solutions include mechanical or optical systems that enable a camera to track the fast-moving scene or object during exposure to remove or reduce the motion of the scene relative to the image sensor. This can be achieved by translation or rotation of the entire camera, by internal movements of components of the camera system for example optical elements or the image sensor or by a combination of any of these methods. This approach involves moving components and requires either detailed prior knowledge or real-time measurement of the relative motion of camera and object to control the precise movement of the camera or camera components. It is only possible to perform the same compensation for the entire image, so any scene with complex motion such as multiple independent fast-moving objects or combinations of camera and object movement will be impossible to handle correctly.

SUMMARY

There is a need for an imaging device and a method that may address the parasitic light sensitivity in global shutter image sensors. Accordingly, there is a need for an imaging device and a method for recording images, which mitigate, alleviate or address the shortcomings existing and enabling the use of super-fast shutter speeds even with bright highlights, fast-moving scenes, and uncontrolled lighting in outdoor and large area applications.

Disclosed is an imaging device for recording images, the imaging device comprising a global shutter image sensor having an array of photoelectric conversion units and light-shielded storage units, imaging optics arranged for incoming light to form an image on the global shutter image sensor, a shutter having an open state in which it allows incoming light to reach the image sensor and a closed state in which it prevents incoming light to reach the image sensor, and a control system configured to synchronize the image sensor and the shutter, wherein the control system is configured to:
 start exposure by resetting the photoelectric conversion units;
 stop exposure by moving charges generated in the photoelectric conversion units to the light-shielded storage units;
 in accordance with the stopping of exposure, initiate readout of the light-shielded storage units; and
 time a closing of the shutter so that the shutter reaches its closed state before the readout of the light-shielded storage units has completed.

Disclosed is a method, performed by an imaging device, for recording images, the imaging device comprising a global shutter image sensor having an array of photoelectric conversion units and light-shielded storage units, imaging optics arranged for incoming light to form an image on the global shutter image sensor, a shutter having an open state in which it allows incoming light to reach the image sensor and a closed state in which it prevents incoming light to reach the image sensor, the method comprising:
 starting exposure by resetting the photoelectric conversion units;
 stopping exposure by moving charges generated in the photoelectric conversion units to the light-shielded storage units;
 in accordance with the stopping of exposure, initiating readout of the light-shielded storage units; and
 timing a closing of the shutter so that the shutter reaches its closed state before the readout of the light-shielded storage units has completed.

Disclosed is a computer readable storage medium storing one or more programs, the one or more programs comprising instructions, which when executed by a control system of an imaging device comprising a global shutter image sensor having an array of photoelectric conversion units and light-shielded storage units, imaging optics arranged for incoming light to form an image on the global shutter image sensor, a shutter having an open state in which it allows incoming light to reach the image sensor and a closed state in which it prevents incoming light to reach the image sensor, cause the imaging device to perform any of the methods disclosed herein.

Disclosed is a use of a mechanical shutter in an imaging device comprising a global shutter image sensor having an array of photoelectric conversion units and light-shielded storage units, imaging optics arranged for incoming light to form an image on the global shutter image sensor, and a control system, wherein the mechanical shutter has an open state in which it allows incoming light to reach the image sensor and a closed state in which it prevents incoming light to reach the image sensor and wherein the mechanical shutter is used to block incoming light from impinging on the global shutter image sensor during readout of the light-shielded storage units.

In global shutter image sensor implementations (in the following in short also referred to as image sensor), the light shield is not 100% lightproof and incoming light causes continued generation of charges in the shielded storage units even after the global shutter functionality has ended exposure, such as during the readout of the recorded image. This 'parasitic light' degrades the recorded image, the degrading effect being particularly large at very fast exposure times where the exposure time is relatively much shorter than the readout time. The disclosed imaging device and the related method allow for an improved imaging device by combining the global shutter functionality of a global shutter image sensor with a shutter such as a mechanical shutter in the optical path of the incoming light. The imaging device and related method provide a precise synchronisation of the global shutter and the shutter which results in reduced degrading effects from parasitic light in the image sensor. This enables the use of very fast exposure times to freeze motion and avoid motion blur in e.g. aerial photography from moving aircrafts or in photographing fast-moving objects with a stationary camera.

It is an advantage of the present disclosure that the disclosed imaging device and method provide Use of global shutter image sensors to record ultra-short-exposure images without streaks from parasitic light.

The use of of-the-shelf global shutter image sensor and mechanical shutter and no additional moving parts.

The ability to operate a mechanical shutter at a slower operating speed to reduce wear and extend lifetime of the shutter while still capturing images with very short shutter speeds utilizing the global shutter image sensor.

The ability to use mechanical shutters with a slower closing speed while still capturing images with no motion blur can enable the creation and use of shutters with larger openings facilitating the creation of lenses with larger maximum apertures. Typically shutters with larger openings will require a longer time to close as the shutter mechanism or mechanisms will have to move a longer distance from the open to the closed position.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

Figure 1:
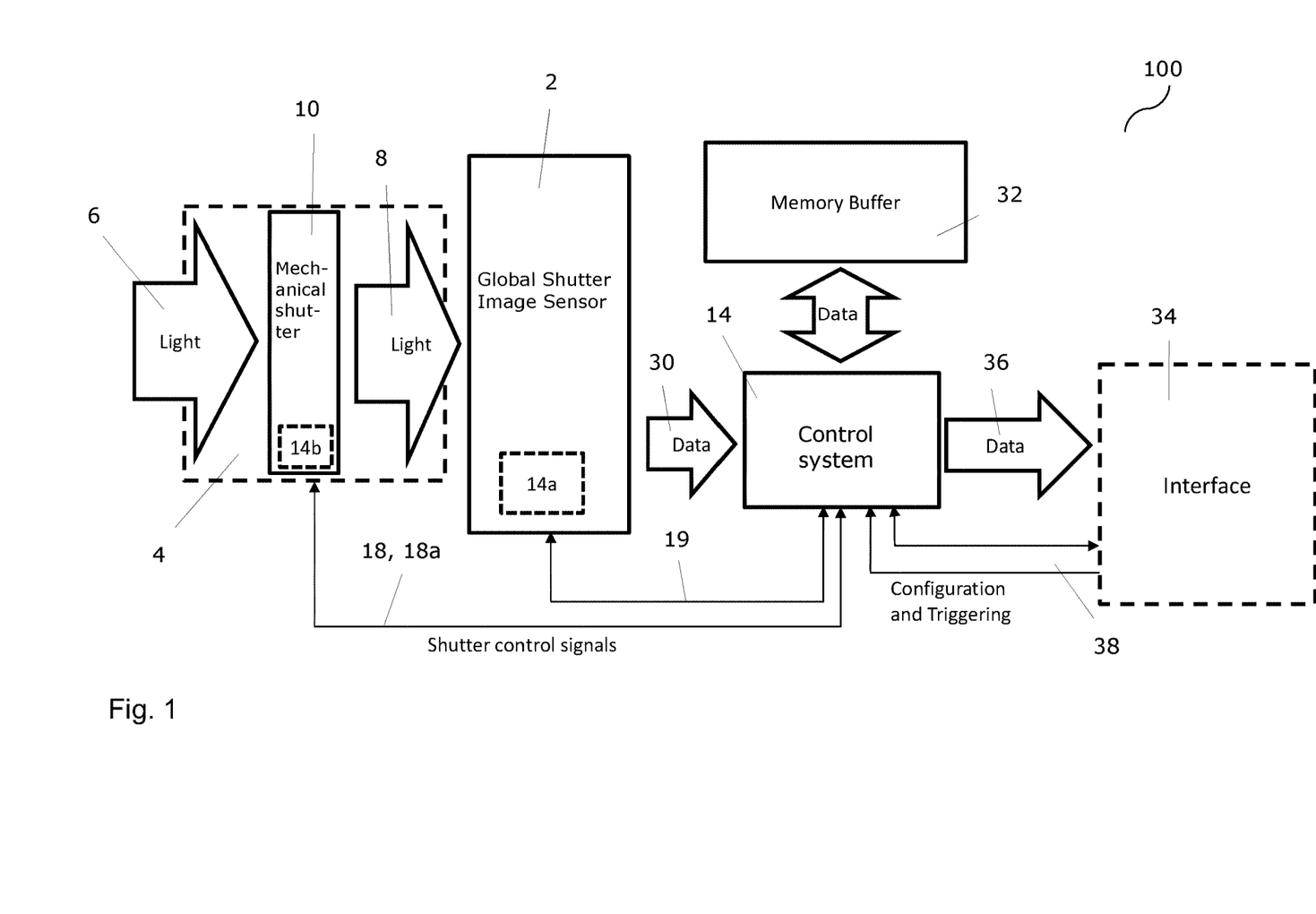
FIG. 1 is a block diagram illustrating an exemplary imaging device according to this disclosure.

FIG. 1 is a block diagram illustrating an exemplary imaging device 100 comprising a global shutter image sensor 2, imaging optics 4 such as lens(es) or an optical system arranged for incoming light 6 to form an image 8 on the global shutter image sensor 2. The global shutter image sensor 2 measures the light intensity of the projected image at an array of pixel locations thereby generating a digital image. The global shutter image sensor 2 has a global shutter functionality enabling it to control the start and end of the time where light is collected at the pixel locations. In an exemplary embodiment, the image sensor 2 is a CMOS global shutter image sensor comprising storage units, herein referred to as light-shielded charge holding unit, to each pixel where the collected light input can be stored during readout. This enables light-collection to end simultaneously across the entire pixel array and not continue during the readout.

A shutter mechanism 10 such as a mechanical shutter is incorporated into the path of the incoming light 6. The shutter has an open state in which it allows incoming light 6 to reach the image sensor 2 and a closed state in which it prevents incoming light 6 to reach the image sensor 2. To be able to control the light hitting the image sensor 2 the shutter 10 can be placed at one of several possible positions in relation to the imaging optics 4: In front of the imaging optics 4, incorporated into the imaging optics 4 or between the imaging optics 4 and the image sensor 2. In all cases the shutter can block incoming light from getting to the image sensor 2. The shutter 10 can open and close in a controlled way by shutter control signal(s) 18. The shutter control signals 18 can be dedicated electrical signals or implemented as a communication protocol. The speed of opening and closing of the shutter should be fast enough to meet the requirements of the timing described later herein.

Figure 2:
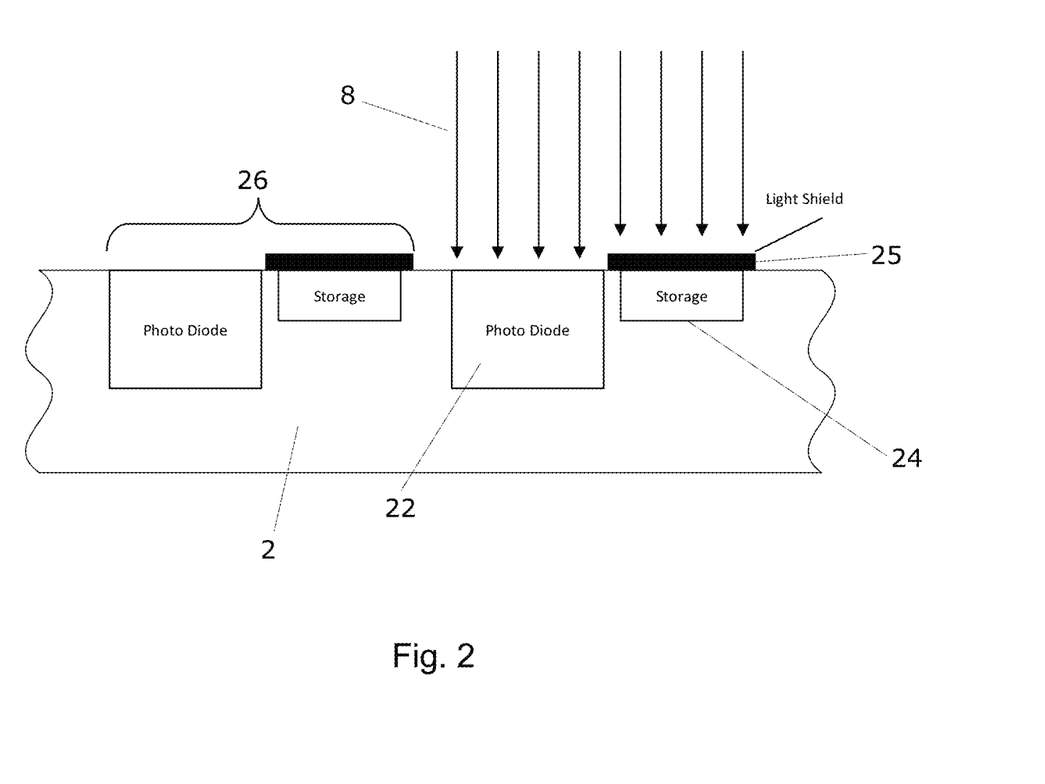
FIG. 2 is an illustration of a global shutter image sensor.

FIG. 2 is an illustration of a global shutter image sensor 20 exemplified by a CMOS global shutter image sensor according to an exemplary embodiment of the disclosure. The CMOS global shutter image sensor 20 comprises an array of photoelectric conversion units 22 (here referred to as photo diodes) and light-shielded storage units 24. The operating principle of a CMOS global shutter image sensors: Each pixel 26 contains a photo diode 22 capable of detecting the amount of incoming light 8 hitting the photo diode 22 during the exposure. As photons enter the photo diode, they cause an accumulation of electrons proportional to the number of photons to build up in the photo diode. To end the exposure and stop the collection of light, the charge collected in the photo diode 22 is moved to the storage unit 24, where it is held either as a charge or a voltage depending on the type of sensor. This happens simultaneously for all pixels 26 across the entire image sensor 20, and this operation—global shutting—can be controlled externally by an electrical interface to the image sensor. The storage unit 24 is protected by a light shield to avoid any photons from entering the storage unit and causing accumulation of additional electrons after the intentioned exposure has been stopped. Once the charges in all the photo diodes 22 have been moved to the storage units 24 they can be read out sequentially.

In actual CMOS global shutter image sensor implementations, the light shield 25 is not 100% lightproof and the incoming light 8 cause generation of charges in the storage unit 24 even after the exposure is supposed to have been stopped. This leaking of light is referred to as Parasitic Light Sensitivity (PLS). PLS is typically, in the range of 65 to 95 dB lower than the sensitivity of the Photo Diode for CMOS Image Sensors. Hence, the global shutter only significantly dampens the light but does not completely shut out the light. Consequently, there is a leaking of parasitic light into the storage units of the pixels after closing the sensor-based global shutter and until the image data has been read out of the storage units, especially for very bright pixels and especially for the pixels read out the last. In images taken under high relative velocities between camera and scene, this causes streaks in the images especially from bright highlights, a problem that increases with very short exposure times, since the amount of light collected during exposure decreases while undesired light leaked during readout remain constant. This increase in the effect of parasitic light sensitivity with shorter exposure times.

Other types of global shutter image sensors exist, such as CCD based global shutter image sensors. In CCDs, the array of photoelectric conversion units 22 and light-shielded storage units 24 are constructed as Metal Oxide Semiconductor (MOS) capacitors. These capacitors accumulate charge as they are hit by photons and at the end of exposure, readout of the image data is performed by shifting the collected charges from capacitor to capacitor across the image sensor and into a charge amplifier at the edge of the sensor. Here the charge is converted to a voltage that can be digitized. If the sensor remains exposed to light during the shifting of the image data, the pixels will continue to accumulate charge causing very significant smear. However, a Global Shutter can be implemented in CCD based image sensors by adding additional light shielded lines of capacitors between the active pixel lines. To end the exposure and close the global shutter, the accumulated charges in the active pixel capacitors are shifted into these the light shielded lines. Subsequently the image data can be shifted across the sensor through the shielded lines protected from additional exposure by the light shields. Many variants of CCD based global shutter sensors has been developed. However, most of these have significant Parasitic Light Sensitivity, and therefore would benefit from the device and/or method described in this disclosure.

This overview of global shutter image sensor operation merely serves to describe the operation relevant for the present disclosure. In addition to the mentioned array of pixels each containing a photo diode, storage unit, and light shield, there are also layers of electrical wiring, color filters, micro lenses, and other necessary parts. The implementation details of these vary greatly between senses. However, the basic operating principle remain the same.

Returning to FIG. 1, the imaging device 100 comprises a control system 14 being configured to record an image. In an exemplary embodiment, to record an image comprises to synchronize the closing of the global shutter of the global shutter image sensor and the shutter, so that the shutter closes shortly after the closing of the global shutter, such as within 50 milliseconds (ms) after closing the global shutter, such as within 30 ms after closing the global shutter, such as within 10 ms after closing the global shutter, such as within 5 ms after closing the global shutter, or within 1 ms after closing the global shutter. The decreasing time-periods represent embodiments with shorter periods of parasitic light in the 'closed' global shutter image sensor and are thus advantageous in that they increasingly reduce the detrimental effects of parasitic light.

The control system 14 controls the timing of the opening and closing of both the shutter 10 and the global shutter of the image sensor 2, for example through control signals 18 and 19. The control system 14 may be implemented in a single physical device, as part of a device shared with other parts of the system, distributed across multiple devices or a combination of these. Implementation of the control system 14 split across multiple physical devices can for example be implemented with a device 14b located physically close to the shutter 10 and/or a device 14a located close to the image sensor 2. This could allow for more precise timing of the control of both of these. The control system 14 can be implemented through custom semiconductor chip design, programmable logic hardware, through software running on a microcontroller or other processor or through any combination of these. The control system 14 also configures the image sensor 2 through the control signals 19 and handles readout of image data 20 from the light-shielded storage units 24 after an image has been captured.

In preferred embodiments, the imaging device may comprise hardware customary for a digital camera. In such embodiments, the recorded image data 30 can be transferred to a memory buffer 32 and later retrieved for processing, analysis, display, transfer or storage. The imaging device may comprise an interface 34 enables external control of the system through a data interface 36 and a control interface 38. The control interface 38 is used to configure parameters for the image recording process and to trigger image capture. The data interface 36 is used to read out image data after the image has been captured. The read-out can either be from the memory buffer 32 or directly from the image sensor 2 if no memory buffer is implemented. The interface 34 can be an external interface in the case where the control system 14 is implemented in a separate chip or other type of subsystem from the main application processor. Alternatively, the interface 34 can be an internal interface in the case where the controller is implemented as part of the main application processor subsystem. The data interface 36 and control interface 38 can be separated and connected to separate subsystems depending on overall system architecture.

The following provides a more comprehensive description of an exemplary image capture sequence using the imaging device described in relation to FIGS. 1 and 2. Not all steps and actions described here are required in the imaging device and method according to the disclosure but included to provide an overview. Also, the order of the steps in the sequence may vary from embodiment to embodiment, and the duration of steps listed as consecutive may overlap.

1. Imaging device is ready to capture an image. Shutter 10 is typically already open allowing light to reach the global shutter image sensor 2.
2. A command or signal is received by the control system 14 from the control interface 38 telling the imaging device to initiate an image capture. This command or signal may come from a user or from an electronic processor determining when images are to be recorded.
3. If the shutter 10 is not already open, it is now opened by the control system using the control signal(s) 18.
4. Global shutter image sensor exposure is initiated by the control system 14 using the control signal(s) 19 to request image sensor 2 to "open" the global shutter and start the exposure.
5. A timer is started in the control system 14 or in the image sensor 2 to precisely count the desired exposure time.
6. The image sensor 2 starts the exposure by resetting the photoelectric conversion units 22.
7. Light detection is ongoing, and electrons are accumulating in the photoelectric conversion units 22 in the pixels 26.
8. When the exposure time has passed, either the control system 14 using control signal(s) 19 or the timer in the image sensor 2 sends a signal or a command to the image sensor 2 to end the global shutter image sensor exposure. This will cause the collected electrons in the photoelectric conversion units 22 to be moved to the light-shielded storage units 24. The global shutter is now "closed" but parasitic light will continue to leak through the light shield 25.

9. The control system 14 signals the shutter 10 to close through the control signal(s) 18.
10. The shutter 10 closes, preventing all incoming light from reaching the image sensor 2 and thus preventing any further contamination of the image from parasitic light leaking into the light-shielded storage units 24 through the light shields 25. Leakage of parasitic light will only continue until the shutter 10 is physically completely closed.
11. The image data 30 is read out from the pixels and into the memory buffer 32 or directly through the interface 34 via data interface 36.
12. When the readout of the image data has been completed, the shutter 10 can be opened again by the control system 14 using the control signal(s) 18 in preparation for capturing the next image.
13. The imaging device is now ready for capturing the next image.

Figure 3:
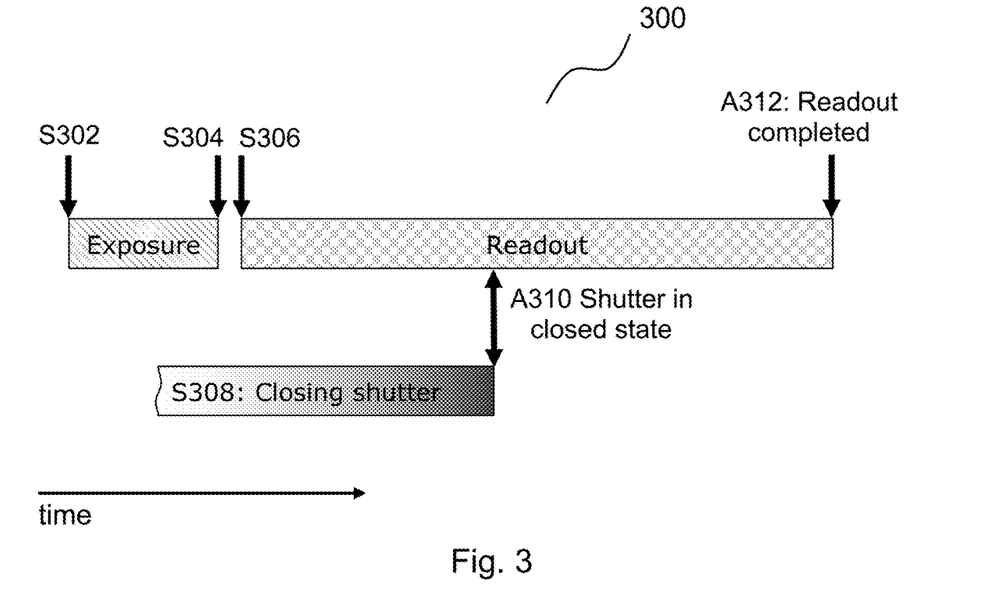
FIGS. 3-8 are timing charts illustrating exemplary timings of the closing on the shutter according to exemplary methods, performed by an imaging device, for recording an image according to this disclosure.

The following focuses on the timing of the closing of the shutter relative to the exposure and the readout. FIG. 3 is a timing-chart illustrating exemplary actions, such as an exemplary method 300, to be performed by the control system 14 of an imaging device 100 for recording an image according to this disclosure. In the timing chart, horizontal bars symbolise processes taking place over a length of time. As these lengths of time may be very different, the chart is not to scale but simply serve to indicate which processes are longer and their relative timing. The vertical arrows symbolise points in time where a process is started, initiated, stopped, completed or finished; where an action is taken, or where a given state has been achieved. Generally, a point in time is denoted with 't', whereas the duration or a time period is denoted by 'T'. A step or an action to be performed by the control system is denoted by 'S', whereas a point in time where something happens (as a result of previous steps or actions) is denoted by 'A', Deviations from this notation may occur.

In preferred embodiments, the control system is configured to start exposure at time $t_{exp.\ start}$ and stop exposure at time $t_{exp.\ stop}$ so that an exposure duration is $t_{exp.\ stop} - t_{exp.\ start} < 0.5$ ms to record a short exposure image.

In an exemplary embodiment, the control system 14 is configured to record an image, wherein to record an image comprises the following steps according to the method 300:
S302: start exposure by clearing/resetting the photoelectric conversion units 22;
S304: stop exposure by moving charges generated in the photoelectric conversion units 22 to the light-shielded storage units 24;
S306: in accordance with the stopping of exposure, initiate readout of the light-shielded storage units 24; and
S308: closing the shutter 10 so that the shutter reaches its closed state at A310 before the readout S306 of the light-shielded storage units has completed at A312.

In exemplary embodiments, the control system is configured to initiate closing of the shutter at or slightly before the stopping of the exposure.

Figure 4:
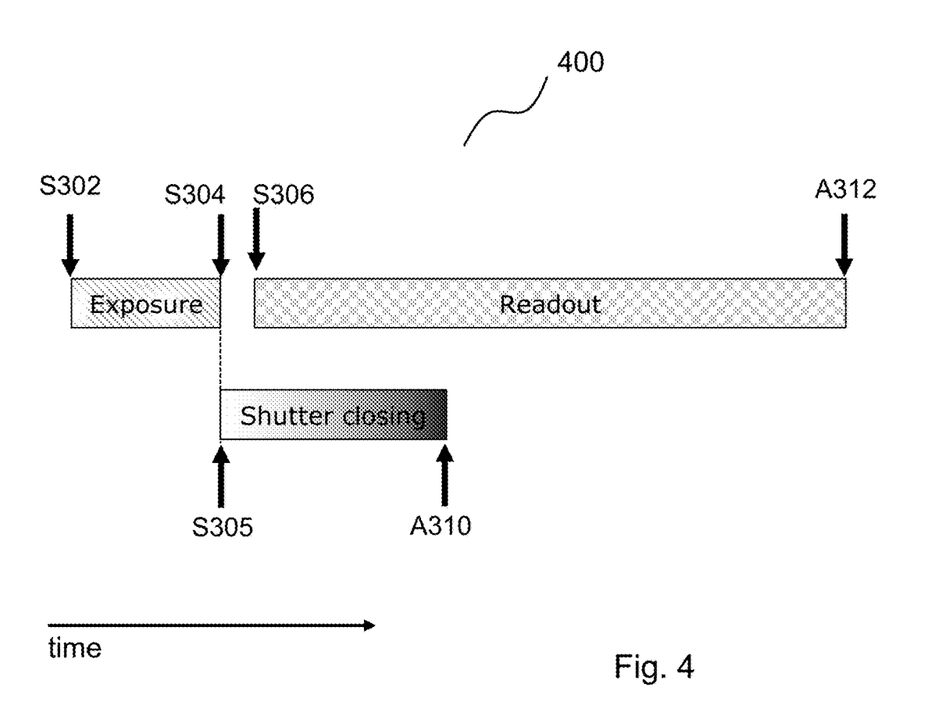

In an exemplary embodiment, the control system 14 is configured to record an image, wherein to record an image comprises the following steps according to the method 400 in FIG. 4:

S302: start exposure by clearing/resetting the photoelectric conversion units 22;
S304: stop exposure by moving charges generated in the photoelectric conversion units 22 to the light-shielded storage units 24;
S305: in accordance with stopping exposure, signal the shutter to start closing; and
S306: initiate readout of the light-shielded storage units 24;
wherein the shutter reaches its closed state at A310 before the readout of the light-shielded storage units has completed at A312.

In this embodiment, setting up the timing requires no knowledge of the performance parameters of the shutter 10. The signal to close the shutter is sent as the exposure is completed, hence there is no risk that the shutter starts blocking light during exposure. Typical readout periods are of the order of tens to hundreds of ms whereas typical shutter closing times, inclusive latencies, are of the order ones to tens of ms. Hence, even with this simple timing, the parasitic light in the image sensor will be blocked for most of the readout period.

Figure 5:
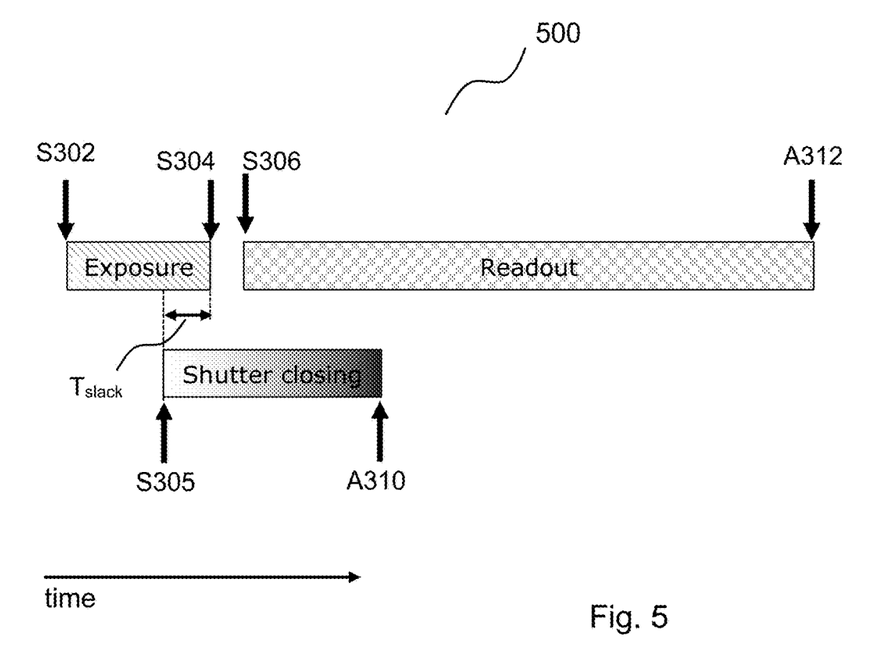

In an exemplary embodiment, the control system 14 is configured to record an image, wherein to record an image comprises the following steps according to the method 500 in FIG. 5:
S302: start exposure by clearing/resetting the photoelectric conversion units 22;
S305: at a time-period $T_{slack}$ before the end of the global shutter exposure at S304, signal the shutter to start closing. If $T_{slack}$ is greater than the exposure time, S305 will be before S302;
S304: stop exposure by moving charges generated in the photoelectric conversion units 22 to the light-shielded storage units 24; and
S306: initiate readout of the light-shielded storage units 24;
wherein the shutter reaches its closed state at A310 before the readout of the light-shielded storage units has completed at A312.

The time $T_{slack}$ must be short enough to avoid shutter mechanism causing any shading of the light before the exposure completes at S304, but may otherwise be as long as possible to take up any slack and further reduce the effect of PLS. For typical mechanical shutters $T_{slack}$ could be in the range of 100's of us to 10's of ms. In this embodiment, a conservative value for $T_{slack}$ may simply be chosen or estimated based on performance parameters provided with the shutter from the manufacturer. Hence, setting up the timing is a simple task while still providing an improved performance.

In exemplary embodiments, the control system is configured to initiate closing of the shutter prior to stopping exposure or even prior to starting exposure.

Figure 6:
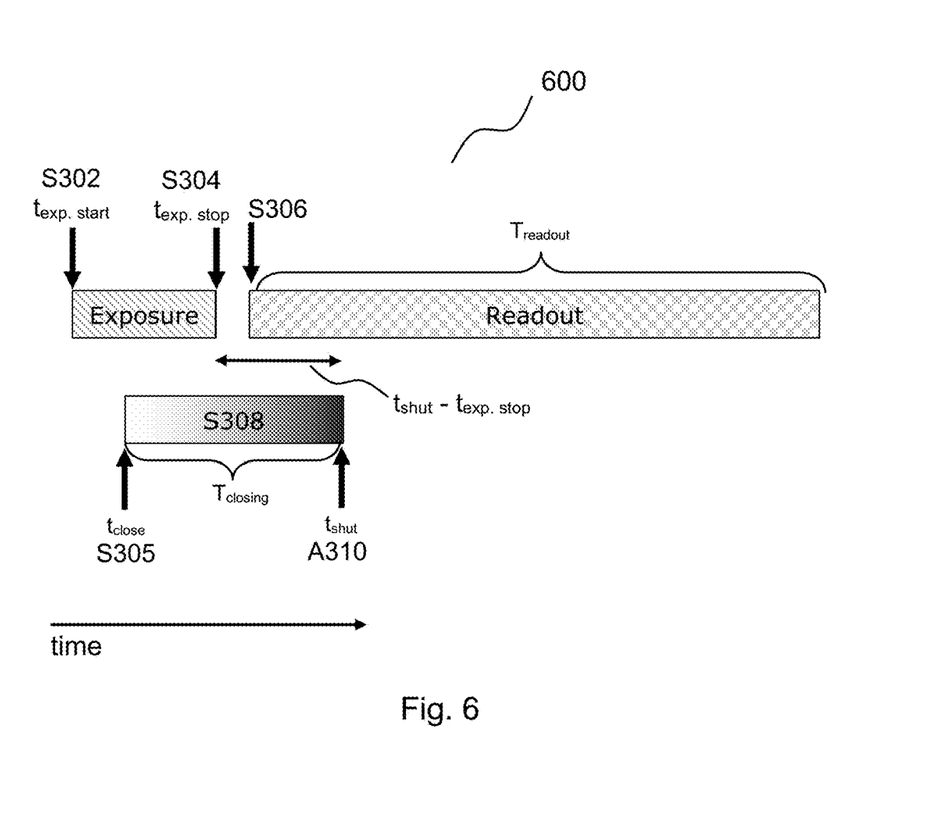

In an exemplary embodiment, illustrated in the timing chart of FIG. 6, the control system 14 is configured to record an image, wherein to record an image comprises the following steps according to the method 600:
S302: start exposure at time $t_{exp.\ start}$ by clearing/resetting the photoelectric conversion units 22;
S304: stop exposure at time $t_{exp.\ stop}$ by initiating movement of charges generated in the photoelectric conversion units 22 to the light-shielded storage units 24 so that an exposure time is $t_{exp.\ stop} - t_{exp.\ start}$;
S305: initiate closing of the shutter 10 at time $t_{close}$, where a period between initiating closing and the shutter 10 being in its closed state is $T_{closing}$ so that the shutter 10 reaches its closed state (A310) at time $t_{shut} = t_{close} + T_{closing}$;

S306: in accordance with the stopping of exposure, initiate readout of the light-shielded storage units 24, where a readout time for reading out charges in all storage units is $T_{readout}$;

time the closing S308 of the shutter 10 to the stopping exposure S304 so that $t_{exp.\ stop} < t_{shut} < t_{exp.\ stop} + T_{readout}$.

The embodiment 600 encompasses the embodiments 400 and 500 described above in relation to FIGS. 4 and 5 and provides a more detailed notation for the timing of the various times and periods. In an exemplary embodiment of the method 600, the closing S308 of the shutter 10 is timed to the stopping exposure S304 so that $(t_{shut} - t_{exp.\ stop})/T_{readout} < 0.5$, such as <0.2 such as <0.1, such as <0.02, such as <0.01 or even smaller.

The decreasing ratios represent embodiments with shorter periods of parasitic light during the readout and are thus advantageous in that they increasingly reduce the detrimental effects of parasitic light.

In the present description, to 'time the closing of the shutter' means to utilize a given, estimated or predetermined value of the closing period of the shutter 10, $T_{closing}$, to initiate the closing, S305, so that the timing-condition is fulfilled. Initiating the closing of the shutter 10, means that the control system 14 sends a signal 18 to the shutter to start closing. This signal 18 may be anything from a signal with coded instructions to a processor of the shutter 10 and a simple electric pulse triggering the closing.

The shutter 10 can be implemented in multiple ways, some examples are: focal plane shutter, lens leaf shutter and liquid crystal panel shutters. Not all of these contain moving mechanical parts or are based on mechanical principles or methods for their operation. However, for the purpose of this disclosure any reference to shutter or mechanical shutter can refer to any of these types of shutters regardless of their underlying technology or operating principle.

Focal plane shutters are mechanical devices, that utilize one or two opaque curtains made up of flexible fabric or rigid blades. These curtains are typically mounted in a frame attached just in front of the image sensor. The curtains can move along this frame to open or block incoming light (6) falling on the image sensor.

Lens leaf shutters are mechanical devices placed in the optical system typically but not necessarily at or close to the focal point. A typical implementation consists of multiple blades attached to a structure surrounding the optical path through the optical system and a mechanism for making these blades move into, intersect with, and block the passage of incoming light (6) impinging on the image sensor.

Movement of the curtains, blades or other opaque moving parts can be driven by mechanical springs, electromagnetic actuators or some other method or device. Some prior art mechanical shutters use solenoid actuators to move the opaque moving parts. This is disadvantageous since such solenoid actuators automatically close when they are charged or energized, and this accumulation of energy leads to response times, such as electrical latencies, of typically tens of ms. Therefore, the solenoid response time must be known very precisely to achieve a very precisely timed mechanical shutting, and the energizing must often be initiated long before the shutter is intended to actually move.

Therefore, in a preferred exemplary embodiment, the mechanical shutter utilizes a linear motor that does not involve a solenoid actuator to move the opaque moving parts. In other words, the mechanical shutter utilizes a linear motor with a mechanical actuator that does not require energizing or charging. In other words, the mechanical shutter utilizes a linear motor with a mechanical actuator that starts moving immediately in response to a triggering signal. In this embodiment, the linear motor may for example be a brushed (iron cored and coreless) motor, stepper motor, or a brushless motor.

Liquid crystal panel shutters have no moving mechanical parts but are instead based on polarizing filters and liquid crystals. They work based on the ability of a liquid crystal layer to change the orientation of polarization of light passing through it and where this change can be controlled by an electrical signal. In a typical example a shutter utilizes two polarizing filters with their axes of transmission perpendicular and a layer between them of liquid crystals capable of changing the rotation of polarization of light passing through and where this change of rotation can be controlled electrically. If the liquid crystal layer does not cause any rotation of the polarization, then no incoming light (6) will pass through the shutter as the two polarizing filters are perpendicular. However, if by changing the electrical signal to the liquid crystal layer, the polarization of the light is changed to rotate 90 degrees, incoming light (6) can pass unhindered through the shutter. There are many additional details to the construction and operation of liquid crystal-based shutters but the basic principle of operation remains the same. For liquid crystal panel shutters there is no mechanical hysteresis and backlash since there are no the moving parts, and the $T_{block}$ introduced below will start when the liquid crystals start changing their rotation and end when they have finished their rotation.

In addition to the above-mentioned types of shutters, there are other technologies that can be used to implement shutters suitable for the method and device in this disclosure for example the Kerr effect, Pockels effect, reflective light valves etc.

Independent of the type of shutter, it may be preferred that the shutter comprises a shutter controller and the control system is configured to time a closing of the shutter by sending an instruction to the shutter controller to close the shutter.

In an imaging device utilizing a shutter there will be a period (also referred to as lag or delay) from receiving the signal 18 to close the shutter and until the shutter completely shuts out all the incoming light. Herein, this closing period is referred to as $T_{closing}$ and is typically of the other of hundreds of microseconds to several milliseconds. This closing time comes from electrical, mechanical and software components involved in the mechanism of closing the shutter as well as the closing action itself. The closing period $T_{closing}$ may be divided into different consecutive periods, each period being a result of latency or the time it takes to carry out a different step involved in closing the shutter. Preferably, the timing of the closing of the shutter utilizes the total closing time or one or more of the periods to fulfil the desired timing-condition and achieve the objective of reducing parasitic light. Hence, initiating the closing of the shutter (S305) may be carried out at some point before the exposure is stopped (S304) as illustrated in the timing charts of FIGS. 5 and 6 and maybe even before the exposure is started (S302) as illustrated in the timing chart of FIGS. 7 and 8.

In an exemplary embodiment, the control system comprises an at least estimated duration, $T_{closing}$, of the closing of the shutter and an at least estimated duration, $T_{readout}$, of the reading out of the light-shielded storage units. These values may be given to the control system or determined, such as by measurement and/or calculation, by the control system. $T_{closing}$ will typically be an estimated value which is subject to variation due to manufacturing tolerances and physical or environmental parameters. $T_{readout}$ can be an estimated or an exact value. The control system is configured to receive a target exposure duration, $T_{exposure}$, via the interface 34, either directly from a user or from an external control system. The control system can then, based on $T_{closing}$, $T_{readout}$, and $T_{exposure}$, determine when to initiate closing of the shutter to arrive at the required timing. It is evident to the skilled person, that since the exposure duration $T_{exposure}-t_{exp.\ stop}-t_{exp.\ start}$ is typically provided as an exact value, $t_{exp.\ stop}$ and $t_{exp.\ start}$ are linked and can be used interchangeably.

In an exemplary embodiment, the total closing time, $T_{closing}$, can be divided into two consecutive periods, $T_{latency}$ and $T_{block}$. Here, $T_{latency}$ is the time it takes from shutter receives the signal to start closing and until the shutter mechanism has reached the state where it is just about to start blocking light impinging on the sensor. $T_{block}$ is then the rest of $T_{closing}$, more specifically it is the time it takes from the shutter mechanism just about to begin blocking the light until it is completely closed and has completely blocked the light. $T_{latency}$ is composed of electronic and software latencies and mechanical hysteresis and backlash in the moving parts and the part of the actual closing process until the point where the blades, curtains or other mechanisms have moved far enough to start to intersect with the light impinging on the sensor. One approach for determining $T_{latency}$ and $T_{block}$ is with a device capable of signalling the shutter to close while continuously measuring the amount of light coming through the shutter from a constant light source. Measuring the time intervals between sending the signal to close and detecting a decrease in the amount of light determines $T_{latency}$ and measuring the time from this point and until light can no more be detected determines $T_{block}$. Other methods or devices can be utilized to achieve higher accuracy or more optimal production processes. For example the movement of the shutter mechanism could be directly detected with optical, magnetic or mechanical sensors or observed with high speed cameras.

Figure 7:
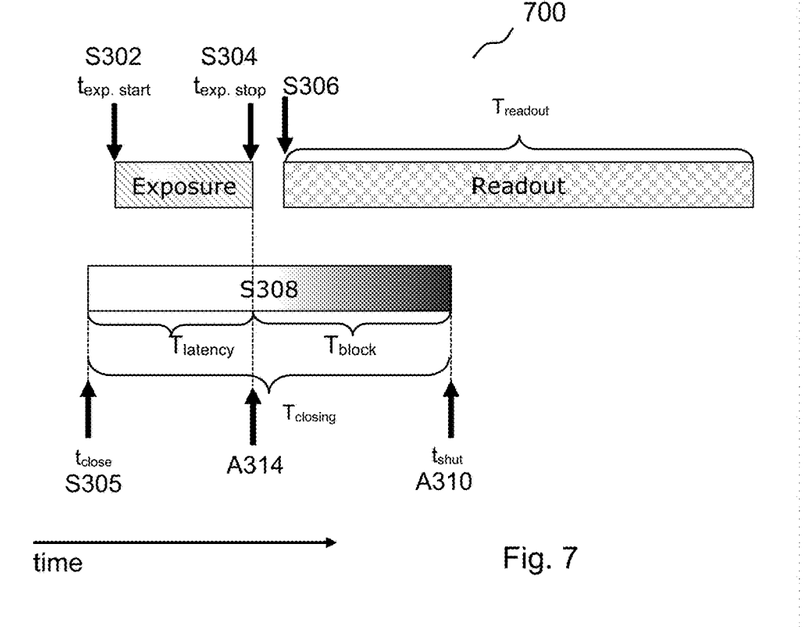
Figure 8:
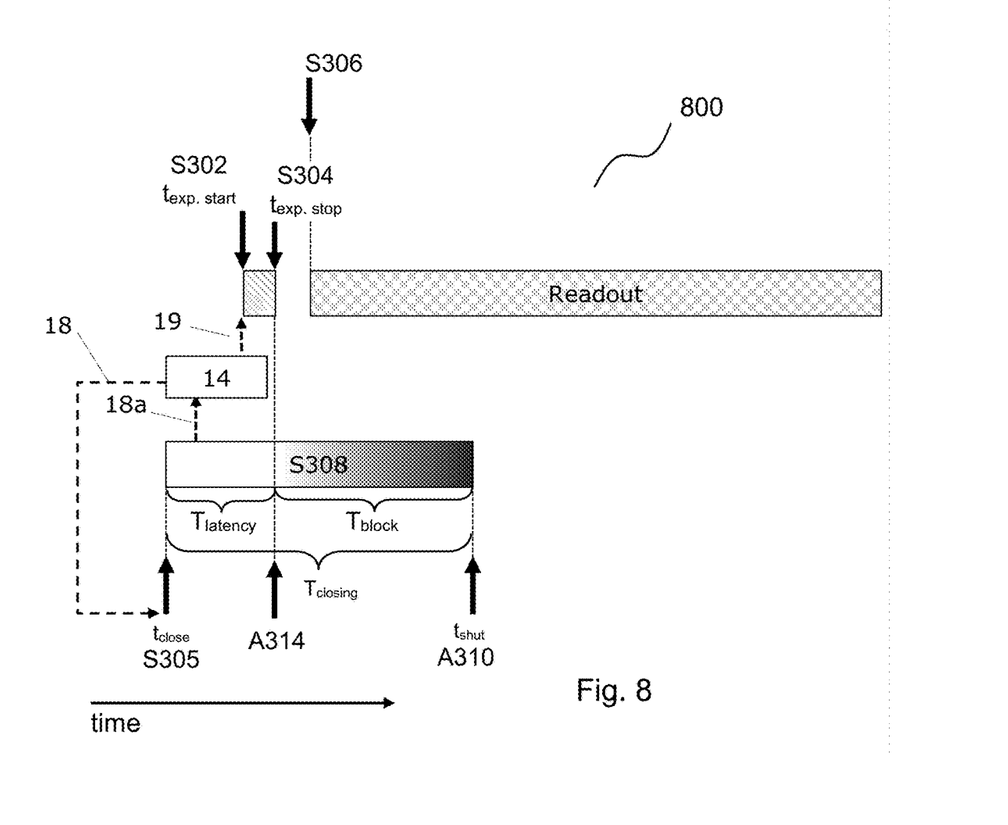

The method 700 in FIG. 7 illustrates an exemplary embodiment where the point in time, A314, where $T_{latency}$ ends and $T_{block}$ starts is simultaneous with $t_{exp.\ stop}$, i.e. shutter 10 starts blocking parts of the incoming light immediately after the global shutter image sensor 2 stops the exposure. Here, the timing condition can be written as $t_{close}+T_{latency}=t_{exp.\ stop}$. As can be seen from FIG. 7, achieving such precise timing of A314 implies very precise knowledge of $T_{latency}$ and then timing $t_{close}$.

In an exemplary embodiment, the shutter is a mechanical shutter with one or more opaque moving parts that are moved to block the incoming light forming the image on the image sensor, and wherein the control system is configured to initiate closing of the mechanical shutter so that the one or more opaque moving parts starts moving prior to stopping exposure. Preferably, the control system is also configured to initiate closing of the mechanical shutter so that the opaque moving parts do not start blocking incoming light otherwise impinging on the image sensor, such as parts of the image, until after stopping exposure.

In this embodiment, the total closing time, $T_{closing}$, can be divided into three consecutive periods, $T_{latency}$, $T_{moving}$, and $T_{block}$. Here $T_{latency}$ comprises electronic and software latencies such as protocol and interrupt latencies, inrush time for electromagnetic coils in linear motors, or latencies due to impedance in power supplies and wiring limiting the current supplied to mechanical actuators and equivalent. $T_{moving}$ is the purely mechanical latency and comprises the time from start of mechanical movement in the shutter, such as from the time when the opaque moving parts starts moving, and until the point where the opaque moving parts start to block light impinging on the sensor, such as parts of the image. Preferably, $T_{moving}$ comprises any mechanical hysteresis and backlash in the mechanical shutter, such as in the opaque moving parts or in some other mechanical part that actuates on the opaque moving parts.

Due to manufacturing tolerances, physical or environmental parameters or other causes the latency can vary between shutters of the same make and model and can vary from exposure to exposure and can change over the lifetime of a shutter. This makes it difficult to determine or estimate the latency $T_{latency}$ or periods thereof and thus it is difficult time the closing of the shutter 10 precisely to start blocking light not before but as soon as possible after the global shutter image sensor 2 exposure has ended.

Therefore, in an exemplary embodiment, initiating closing of the shutter (S305 at $t_{close}$) is performed under the timing condition $t_{close}+T_{latency}>t_{exp.\ stop}$ which means that the closing shutter starts blocking light impinging on the image sensor after stopping the exposure. To reduce the effect of parasitic light as much as possible, it is desirable that the closing shutter starts blocking light as soon as possible after stopping the exposure. Since 'as soon as possible' is hard to quantify, the following exemplary embodiments lists additional timing conditions that may be applied in combination with the timing condition $t_{close}+T_{latency}>t_{exp.\ stop}$:

shutter closing (S305) is initiated prior to stopping the exposure, $t_{close}<t_{exp.\ stop}$.

shutter closing (S305) is initiated prior to starting the exposure, $t_{close}<t_{exp.\ start}$.

$T_{latency}$ ends (A314) less than 0.1 ms after stopping the exposure, $t_{close}+T_{latency}<t_{exp.\ stop}+0.1$ ms.

$T_{latency}$ ends (A314) less than 0.5 ms after stopping the exposure, $t_{close}+T_{latency}<t_{exp.\ stop}+0.5$ ms.

$T_{latency}$ ends (A314) less than 1 ms after stopping the exposure, $t_{close}+T_{latency}<t_{exp.\ stop}+1$ ms.

To further reduce the effect of parasitic light, exemplary embodiments using more elaborate shutter synchronization mechanisms are provided.

1. In an exemplary embodiment, an estimate is made of the shutter latency period, $T_{latency}$. This can be a fixed number, or it can be a more elaborate model based on one or more of the following: Per unit measurements done during production, measurements of system parameters e.g. temperature, voltages etc., shutter lifetime modeling, selected aperture of the lens, shutter parameters e.g. shutter speed, number of exposures in a sequence etc., other factors. Both an estimate of the length of the shutter latency and an estimate of the precision of this estimate is needed. Combining these a shortest possible or "minimum shutter latency" can be calculated. Using this "minimum shutter latency", the optimal timing sequence between when to signal the closing of the mechanical shutter 10, $t_{close}$, and the global shutter image sensor 2, S302 and/or S304, can be established to minimize the amount of time the mechanical shutter 10 remains open after the global shutter is closed.

2. A mechanism is built into the mechanical shutter 10 to return a "shutter closing" signal 18a to the control system 14 a fixed time $T_{offset}$ before the shutter mechanism will start blocking the light. This signal should be generated by electrical, mechanical, optical or other means coupled tightly to the physical shutter mechanism in order to reduce the variability of the timing of this signal in relation to A314, the physical closing of the shutter. This signal should be emitted long enough before A314 to allow for the control system 14 to, in response to receiving the return signal 18a, send a signal 19 to the image sensor to start exposure and for the whole exposure to elapse before the physical shutter mechanism starts to interfere with the light on the sensor, i.e. before A314. This is illustrated by method 800 in FIG. 8. Thus, in an exemplary embodiment, the shutter controller is configured to send a shutter closing signal to the control system a fixed time, $T_{offset}$, before the shutter will start blocking parts of the image. In another exemplary embodiment, the shutter controller is configured to send the shutter closing signal in response to receiving the instruction to close the shutter. In another exemplary embodiment, the control system is configured to start exposure in response to receiving the shutter closing signal, and to stop exposure before the shutter will start blocking parts of the image.

3. The imaging device may measure the latency period between signalling the shutter to close at S305 or $t_{close}$ and receiving the return signal signal 18a from the shutter. This period can be measured precisely by the control system 14 and be used to create a more accurate estimation of this part of the shutter latency for use in subsequent image captures. This can help compensate for both changing environmental conditions such as temperature or air pressure and compensate for slow changes in latency as the shutter ages over time and with use. Thus, in an exemplary embodiment, the control system is configured to measure a shutter latency between sending an instruction to close the shutter and the shutter starting to block parts of the image. This may, for example, be implemented by performing a series of exposures with under constant lighting conditions while varying a delay between sending an instruction to close the shutter and starting the exposure. The delay where the total illumination if the image sensor starts to decrease (due to the shutter starting to block parts of the image) is a measure of the shutter latency. In a further exemplary embodiment, the control system is configured to utilize the measured shutter latency when timing the closing of the shutter.

According to the present disclosure, the shutter 10 serves to reduce the detrimental effect of parasitic light in the lens by completely blocking incoming light after exposure and does not play a role in starting or stopping the exposure. Hence, the capacity of the imaging device to capture images with very short exposure times is not limited by the closing speed of the shutter 10, but by the speed of the global shutter image sensor 2. Therefore, in an exemplary embodiment, the shutter 10 is a mechanical shutter operated or operating at a speed slower than its fastest speed or the fastest recommended speed according to manufacturing parameters or recommendations. This provides the advantage of an extended operating lifetime, larger maximum number of actuations, improved reliability or other reliability or lifetime improvements. These benefits could be achieved through either physical changes to the shutter mechanism or through changing the operation by adjusting electrical signals, changing timing, modifying the control sequence or other methods to make the shutter operate in a slower way that reduces mechanical wear and tear.

Further, since the capacity of the imaging device for recording high-speed images with reduced motion blur is not dependent on the speed of shutter 10, it is possible to use a mechanical shutter with a large maximum aperture. Mechanical shutters with large apertures will generally have longer closing times ($T_{block}$) than mechanical shutters with smaller apertures since the distances to be moved and the mass of the parts are smaller for smaller apertures. Therefore, in a preferred embodiment, the mechanical shutter has a large aperture, such as aperture in its open state or maximum aperture, preferably with a diameter larger that 20 mm, such as preferably larger than 25 mm, such as preferably larger than 30 mm. The use of such mechanical shutters with larger apertures facilitates the use and/or creation of imaging optics (such as lenses) with larger maximum apertures.

In another aspect, the invention provides the use of a mechanical shutter in an imaging device comprising a global shutter image sensor having an array of photoelectric conversion units and light-shielded storage units, imaging optics arranged for incoming light to form an image on the global shutter image sensor, and a control system, wherein the mechanical shutter has an open state in which it allows incoming light to reach the image sensor and a closed state in which it prevents incoming light to reach the image sensor and wherein the mechanical shutter is used to block incoming light from impinging on the global shutter image sensor during readout of the light-shielded storage units.

In exemplary embodiments, the use comprises using the shutter according to the methods 300, 400, 500, 600, 700, and 800 described previously may In an exemplary embodiment, the mechanical shutter.

In an exemplary embodiment, the use comprises operating the shutter at a speed slower than the fastest recommended speed according to manufacturing parameters or recommendations.

The various exemplary methods, devices, and systems described herein are described in the general context of method steps or processes, which may be implemented in one aspect by a computer program product, embodied in a computer-readable medium, including computer-executable instructions, such as program code, executed by computers in isolation or in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

The following will describe improvements in image quality realistically achievable by the imaging devices and methods according to the disclosure using typical timing characteristics and Parasitic Light Sensitivity values of typical sensors.

Image capture parameters:
Global shutter image sensor exposure time, $t_{exp.\ stop} - t_{exp.\ start}$: 1/6000 s=0.166 ms
Readout time, $T_{readout}$: 200 ms
Parasitic Light Sensitivity: −80 db=0.0001
Mechanical shutter closing period, $T_{closing}$: 1 ms
Ratio between desired image data and parasitic signal from light leaking through the light shields 25:
Global shutter only: 0.166 ms/(200 ms*0.0001)=8.33=18 db
Combined global shutter and mechanical shutter: 0.166 ms/(1 ms*0.0001)=1666.66=64 db As can be clearly seen this is a very significant difference. Consequently, the methods and devices disclosed herein can enable very high-quality image capture in circumstances and conditions not possible with other solutions.

The present invention can advantageously be applied in geospatial imaging. In geospatial imaging, the obtainable resolution or GSD (Ground Sampling Distance) is limited by the relative movement of the camera in relation to the target being imaged. This can be due to movement of the camera e.g., mounted on a moving platform such as an aircraft or ground vehicle or movement of the target object such as the blades of wind turbine. At any given speed of relative movement, the obtainable GSD is limited by the exposure time. Any movement of more that ½ pixel during the exposure will result in significant deterioration of image quality due to motion blur. The mechanical shutters used in current, high-end geospatial cameras are not able to provide exposure times faster than approximately 1/2000s. This severely limits the potential of providing super high GSD from fast moving platforms and of fast-moving objects.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. An imaging device for recording images, the imaging device comprising a global shutter image sensor having an array of photoelectric conversion units and light-shielded storage units, imaging optics arranged for incoming light to form an image on the global shutter image sensor, a shutter having an open state in which it allows incoming light to reach the image sensor and a closed state in which it prevents incoming light to reach the image sensor, and a control system configured to synchronize the image sensor and the shutter, wherein the control system is configured to:
start exposure by resetting the photoelectric conversion units;
stop exposure by moving charges generated in the photoelectric conversion units to the light-shielded storage units;
in accordance with the stopping of exposure, initiate readout of the light-shielded storage units; and
time a closing of the shutter so that the shutter reaches its closed state before the readout of the light-shielded storage units has completed;
wherein to time the closing of the shutter comprises to initiate the closing of the shutter by sending a first signal to the shutter;
wherein the shutter is configured to, after receiving the first signal, send a shutter closing signal related to closing the shutter to the control system; and
wherein the control system is configured to start exposure in response to receiving the shutter closing signal.

2. The imaging device according to claim 1, wherein the control system comprises an at least estimated duration, $T_{closing}$, of the closing of the shutter and an at least estimated duration, $T_{readout}$, of the reading out of the light-shielded storage units, wherein the control system is configured to receive a target exposure duration, $T_{exposure}$, and wherein to time a closing of the shutter comprises to determine when to initiate closing of the shutter based on $T_{closing}$, $T_{readout}$, and $T_{exposure}$.

3. The imaging device according to claim 1, wherein the control system is configured to:
start exposure at time $t_{exp.\ start}$;
stop exposure at time $t_{exp.\ stop}$ so that an exposure duration $T_{exposure} = t_{exp.\ stop} - t_{exp.\ start} < 0.5$ ms to record a short exposure image.

4. The imaging device according to claim 1, wherein the control system is configured to initiate closing of the shutter after stopping exposure.

5. The imaging device according to claim 1, wherein the control system is configured to initiate closing of the shutter prior to stopping exposure.

6. The imaging device according to claim 5, wherein the control system is configured to initiate closing of the shutter prior to starting exposure.

7. The imaging device according to claim 6, wherein to initiate closing of the shutter comprises to send a first signal to the shutter instructing the shutter to close prior to sending a signal to the global shutter image sensor instructing the global shutter image sensor to start exposure.

8. The imaging device according to claim 1, wherein the control system is configured to measure a latency between sending the first signal to the shutter and receiving the return signal from the shutter and to adjust the timing of the shutter for subsequent image captures based on the measured latency.

9. The imaging device according to claim 1, wherein the control system is configured to:
start exposure at time $t_{exp.\ start}$;
stop exposure at time $t_{exp.\ stop}$;
initiate closing of the shutter at time $t_{close}$, where a latency period between initiating closing and the shutter starting to block incoming light is $T_{latency}$;
time the closing of the shutter to stopping exposure so that
$t_{close} + T_{latency} > t_{exp.\ stop}$.

10. The imaging device according to claim 9, wherein the control system is configured to time the closing of the shutter to stopping exposure so that $T_{latency}$ ends less than 0.1 ms after stopping the exposure, $t_{close} + T_{latency} < t_{exp.\ stop} + 0.1$ ms.

11. The imaging device according to claim 1, wherein the global shutter image sensor is a CMOS global shutter image sensor.

12. A method to be performed by a control system and a shutter of an imaging device for recording images, the imaging device comprising a global shutter image sensor having an array of photoelectric conversion units and light-shielded storage units, imaging optics arranged for incoming light to form an image on the global shutter image sensor, the shutter having an open state in which it allows incoming light to reach the image sensor and a closed state in which it prevents incoming light to reach the image sensor, the method comprising:

starting exposure by resetting the photoelectric conversion units;

stopping exposure by moving charges generated in the photoelectric conversion units to the light-shielded storage units;

in accordance with the stopping of exposure, initiating readout of the light-shielded storage units; and timing a closing of the shutter so that the shutter reaches its closed state before the readout of the light-shielded storage units has completed;

wherein timing the closing of the shutter comprises initiating the closing of the shutter by sending a first signal from the control system to the shutter;

after receiving the first signal, sending a shutter closing signal related to closing the shutter from the shutter to the control system; and starting exposure in response to receiving the shutter closing signal.

13. Use of a shutter in an imaging device comprising a global shutter image sensor having an array of photoelectric conversion units and light-shielded storage units, imaging optics arranged for incoming light to form an image on the global shutter image sensor, and a control system, wherein the shutter has an open state in which it allows incoming light to reach the image sensor and a closed state in which it prevents incoming light to reach the image sensor and wherein the mechanical shutter is used to block incoming light from impinging on the global shutter image sensor during readout of the light-shielded storage units, the use comprising initiating the closing of the shutter by sending a first signal from the control system to the shutter;

after receiving the first signal, sending a shutter closing signal related to closing the shutter from the shutter to the control system; and starting exposure in response to receiving the shutter closing signal.

\* \* \* \* \*